(No Model.)
W. P. BETTENDORF.
METALLIC WHEEL.
No. 374,575. Patented Dec. 13, 1887.
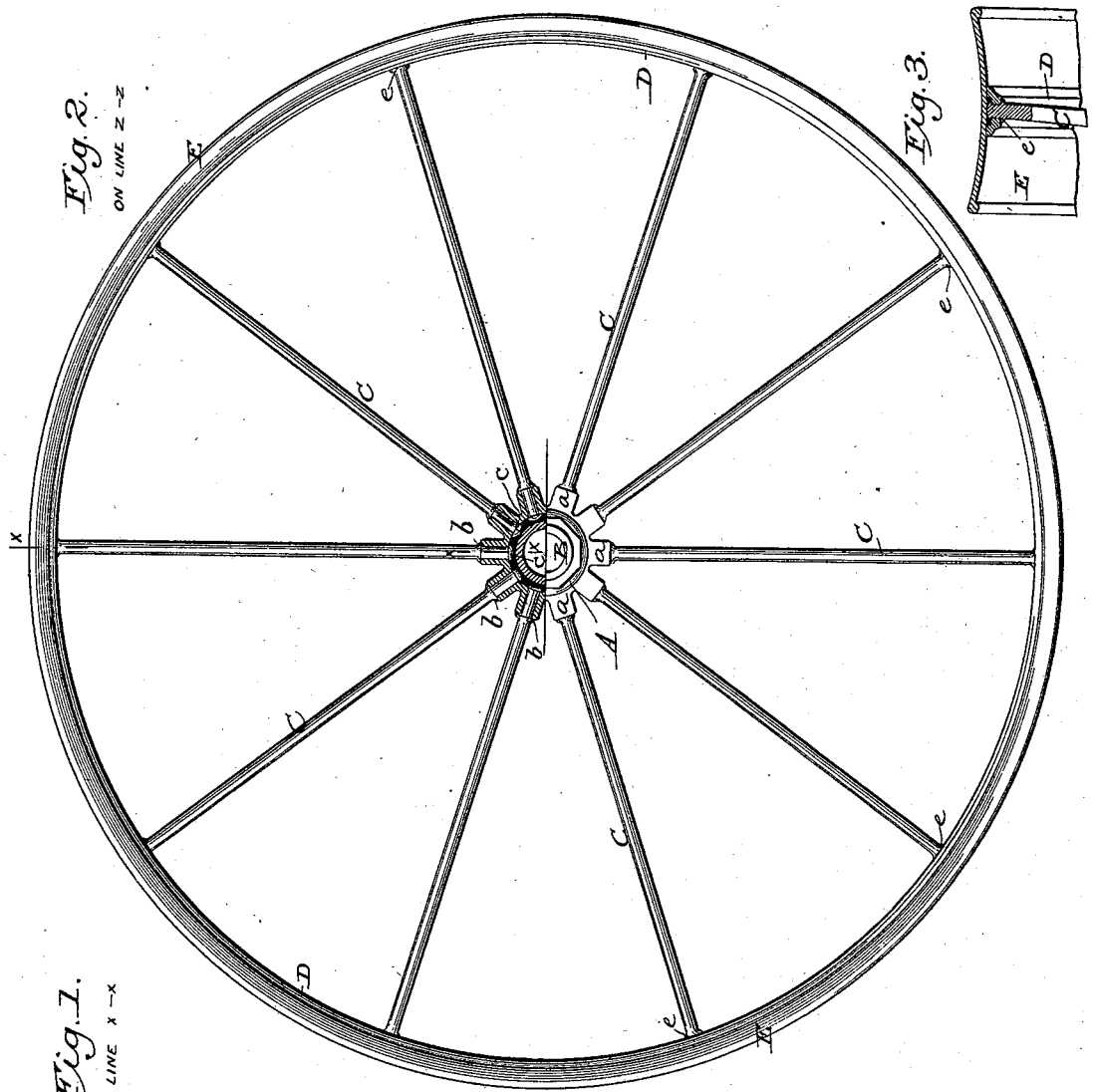
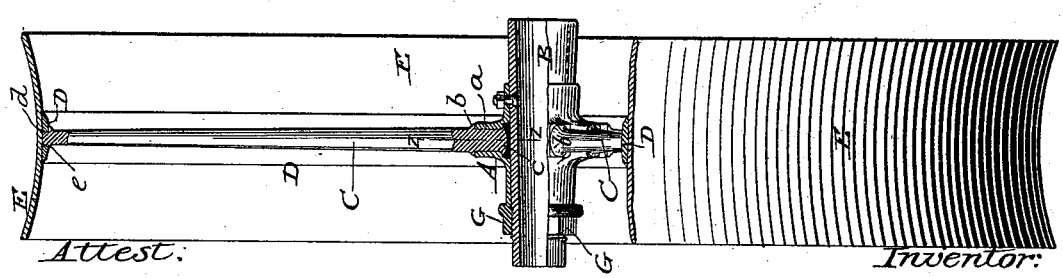
Attest:
Sidney P. Hollingsworth
F. T. Chapman
Inventor:
W. P. Bettendorf.
By his atty
Phil T. Dodge

UNITED STATES PATENT OFFICE.

WILLIAM P. BETTENDORF, OF DAVENPORT, IOWA.

METALLIC WHEEL.

SPECIFICATION forming part of Letters Patent No. 374,575, dated December 13, 1887.

Application filed May 20, 1887. Serial No. 238,880. (No model.)

*To all whom it may concern:*

Be it known that I, WILLIAM P. BETTENDORF, of Davenport, in the county of Scott and State of Iowa, have invented certain Improvements in Metallic Wheels, of which the following is a specification.

My invention has reference to wheels intended for use on corn-planters and similar machines which require a broad rim or tire.

The aims of the invention are to produce a cheap and durable wheel, the construction of which will admit of the wheel being made and sold complete, except as to the outer rim, and which will admit of the latter being readily applied by the implement manufacturer or other purchaser.

In the accompanying drawings, Figure 1 represents an edge view of my wheel with one-half in section on the line $x\ x$ of Fig. 2. Fig. 2 is a side view of the wheel with one-half on the line $z\ z$ of Fig. 1. Fig. 3 is a cross-section showing the inner end in a modified form.

Referring to the drawings, A represents a metallic hub; B, a removable box passing therethrough; C, the metallic spokes attached at their inner ends to the hub; D, the inner rim secured to the outer ends of the spokes, and E the outer and wider rim secured around the rim D.

The hub A is cast or otherwise made of tubular form, with a series of spoke-receiving sockets, $a$. The spokes C, which are made of steel, wrought metal, or other material, of suitable form in cross-section, are seated tightly in the sockets and secured against longitudinal motion by beads or enlargements $b$ and $c$ at the outer and inner ends of the sockets. The attachment of the spokes is preferably effected by inserting the same into the socket and then upsetting the metal in a longitudinal direction to expand the spoke and form the beads, as shown. As this mode of attachment is already practiced in the art and suitable means are known therefor, it is unnecessary to describe the same in detail herein.

The rim D is made of wrought metal, of any suitable form in cross-section, preferably with a flat or slightly-concave outer surface, and is provided at suitable points with perforations to receive the outer ends of the spokes, the perforations being enlarged or countersunk at the outer end. The spokes are passed through the rim D from the inside, and secured by heading or upsetting their outer ends flush with the outer face of the rim D, as shown at $d$, and also by providing them with the bead or enlargement $e$, bearing against the inner face of the rim. The mode of attachment to the rim may, however, be modified, provided only that the outer ends of the spokes lie flush with or below the outer surface of the rim.

The hub, spokes, and rim D, when united, as described, constitute a complete and rigid wheel, having, however, a tread too narrow to admit of its use in corn-planters. In order to adapt it for such use, I apply the secondary or outer rim, E, which is made of wrought metal in one continuous unbroken piece and of a width of six inches, more or less. This rim is applied around and shrunk tightly upon the rim D, and when applied forms a permanent portion of the wheel. This rim is preferably formed with a concave outer surface, as shown.

The construction of the wheel with a double rim—that is to say, a rim consisting of an inner narrow portion and an outer broad portion—is attended with several advantages; First, the parts may be handled and the spokes secured to the narrow rim with much greater facility than to a broad rim; second, the wide rim may be made of thin metal, cheaply produced, and properly supported and stiffened by the inner rim bearing midway of its width; and, third, the wheels may be advantageously manufactured at a central point without the outer rim, sold in the trade as an article of commerce to implement manufacturers, and the outer rim applied by such manufacturer, thus avoiding much expense which would otherwise attend the transportation and storage of the bulky wheel.

The hub may be formed in any appropriate manner; but I prefer to insert therethrough a removable pipe-box, B, which is tapered externally and secured by a nut, G, threaded thereon and bearing against one end of the hub. A bolt may also be passed through the hub and box to prevent the latter from turning within the former when required.

Instead of sinking the outer enlarged ends of the spokes into countersunk holes in the rim, the latter may be formed, as in Fig. 3, with a continuous groove or channel in its outer face to receive the heads of the spokes. The spokes, being headed or enlarged within this channel, hold the rim securely in position, while at the same time their outer ends lie below the periphery of the rim, so that the outer rim or tread may be applied, as shown.

Having thus described my invention, what I claim is—

1. The herein-described wheel, consisting of a metal hub, metal spokes extended through the hub to its interior and secured therein by enlargement, the narrow metal rim having the spokes extended therethrough and secured thereto by enlargement, and the outer and wider rim of metal formed in an endless piece and shrunk permanently upon the inner rim over the ends of the spokes, as described and shown.

2. A metal wheel for corn-planters and similar machines, having a wide outer rim concave in cross-section and an inner narrow rim to which the spokes are secured, as described.

In testimony whereof I hereunto set my hand, this 25th day of April, 1887, in the presence of two attesting witnesses.

WILLIAM P. BETTENDORF.

Witnesses:
A. H. AHRMS,
HY NADLER.